United States Patent
Symes

(10) Patent No.: US 7,260,711 B2
(45) Date of Patent: Aug. 21, 2007

(54) SINGLE INSTRUCTION MULTIPLE DATA PROCESSING ALLOWING THE COMBINATION OF PORTIONS OF TWO DATA WORDS WITH A SINGLE PACK INSTRUCTION

(75) Inventor: Dominic Hugo Symes, Cherry Hinton (GB)

(73) Assignee: ARM Limited, Cambridge (GB)

( * ) Notice: Subject to any disclaimer, the term of this patent is extended or adjusted under 35 U.S.C. 154(b) by 452 days.

(21) Appl. No.: 09/960,728

(22) Filed: Sep. 24, 2001

(65) Prior Publication Data

US 2002/0040427 A1 Apr. 4, 2002

(30) Foreign Application Priority Data

Oct. 4, 2000 (GB) ................... 0024312.1

(51) Int. Cl.
*G06F 7/76* (2006.01)
(52) U.S. Cl. ..................................... 712/300
(58) Field of Classification Search ................ 712/22, 712/300, 223
See application file for complete search history.

(56) References Cited

U.S. PATENT DOCUMENTS

| | | |
|---|---|---|
| 4,109,310 A | 8/1978 | England et al. |
| 4,520,439 A | 5/1985 | Liepa |
| 5,276,881 A * | 1/1994 | Chan et al. ............... 717/147 |
| 5,276,891 A | 1/1994 | Patel |
| 5,390,135 A | 2/1995 | Lee et al. |
| 5,423,010 A | 6/1995 | Mizukami |
| 5,487,159 A | 1/1996 | Byers et al. |
| 5,922,066 A | 7/1999 | Cho et al. |
| 6,098,087 A | 8/2000 | Lemay |

FOREIGN PATENT DOCUMENTS

| | | |
|---|---|---|
| EP | 0 307 166 A2 | 3/1989 |
| EP | 0 913 764 A1 | 5/1999 |
| GB | 2 267 370 A | 12/1993 |
| JP | 5-88887 | 4/1993 |
| WO | WO9617289 | 6/1996 |
| WO | WO9617291 | 6/1996 |

OTHER PUBLICATIONS

Intel Corporation, "IA-64 Application Developer's Architecture Guide," May 1999, pp. 7-117, 135,150,158,169,182,183,184.*
Philips Electronics, "TriMedia—TM1000 Preliminary Data Book," 1997, pp. A-60, 61, 62.*
Motorola, "MC88110—Second Generation RISC Microprocessor User's Manual," 1991, pp. 5-10, 5-11.*
Digital Equipment Corporation, "VAX11 780 Architecture Handbook," 1977, pp. 7-18, 7-19.*

* cited by examiner

*Primary Examiner*—Eddie Chan
*Assistant Examiner*—David J. Huisman
(74) *Attorney, Agent, or Firm*—Nixon & Vanderhye P.C.

(57) ABSTRACT

A data processing system is provided with an instruction (PKH) that combines a packing operation of respective portions of input operand data words (Rn, Rm) into an output data word (Rd) together with the ability to select one of the portions to be combined from a variable position (k) within its respective input operand data word in a manner that allows additional processing to be carried out together with the packing operation. The instruction conveniently combines either the top or bottom half of one of the input operand data words with a half data word portion selected from a variable position within the other input operand data word.

14 Claims, 4 Drawing Sheets

SINGLE INSTRUCTION MULTIPLE DATA PROCESSING ALLOWING THE COMBINATION OF PORTIONS OF TWO DATA WORDS WITH A SINGLE PACK INSTRUCTION

BACKGROUND OF THE INVENTION

1. Field of the Invention

This invention relates to the field of data processing systems. More particularly, this invention relates to a data processing system in which It is desired to provide single instruction multiple data type operation.

2. Description of the Prior Art

Single instruction multiple data operation is a known technique whereby data words being manipulated in accordance with a single instruction in fact represent multiple data values within those data words with the manipulation specified being independently performed upon respective data values This type of instruction can increase the efficiency with which a data processing system may operate and is particularly useful in reducing code size and speeding up processing operation. The technique is commonly, but not exclusively, applied to the field of manipulating data values representing physical signals, such as in digital signal processing applications.

When extending the data processing capabilities of a data processing system, an important consideration is the extent of any size, complexity, cost and power consumption overheads that may be introduced to support the additional processing capability Measures that can add processing capability whilst reducing the additional overhead incurred are strongly advantageous.

SUMMARY OF THE INVENTION

Viewed from one aspect the present invention provides apparatus for processing data, said apparatus comprising: a shifting circuit; and a bit portion selecting and combining circuit; and an instruction decoder responsive to an instruction to control said shifting circuit and said bit portion selecting and combining circuit to perform an operation upon a data word Rn and a data word Rm, wherein said operation yields a value given by: selecting a first portion of bit length A of said data word Rn extending from one end of said data word Rn; selecting a second portion of bit length B of said data word Rm subject to an arithmetic right shift specified as a shift operand within said instruction; and combining said first portion and said second portion to form respective different bit position portions of an output data word Rd.

The invention provides an efficient packing instruction that allows different portions of two input operand data words to be combined within a packed output data word using a single instruction. Furthermore, the invention provides a shift operand that allows one of the data words being packed to be selected from a variable position within its input operand data word in a manner that provides the ability to combine an additional data manipulation with the packing operation, e.g. one of the portions to be combined into the packed output data word may be multiplied or divided by a power of two at the same time that it is being packed together with another data word portion. This contrasts with a system which may only pack together data words from fixed positions within input operand data words. The invention recognizes that a packing operation is a relatively simple operation for the data path of a data processing system to perform and accordingly additional functionality may be added to the packing operation utilizing circuit elements already present within the data path and without introducing processing cycle time constraints.

It will be appreciated that the fixed position multibit portion taken from one end of an input operand data word could be taken from either the most significant bit end or the least significant bit end of that input operand data word. These possibilities correspond to the packing of the top halves of words or the bottom halves of words in common terminology.

Particularly preferred embodiments of the invention are ones in which the first portion and the second portion abut within the output data word and the first portion and the second portion are of equal length and together fill the output data word.

In many real life DSP situations it is convenient that the data word halves have a bit length of sixteen.

The additional functionality of the instruction of the present invention may be particularly conveniently provided in systems within which a shifting circuit is provided upstream of a selecting and combining circuit within the data path. The selecting and combining circuit may conveniently be disposed in parallel with an arithmetic circuit within the data path as it is not desired to combine the packing operation with a function provided by the arithmetic circuit.

Viewed from another aspect the present invention provides a method of data processing, said method comprising the steps of decoding and executing an instruction that yields a value given by: selecting a first portion of bit length A of said data word Rn extending from one end of said data word Rn; selecting a second portion of bit length B of said data word Rm subject to an arithmetic right shift specified as a shift operand within said instruction; and combining said first portion and said second portion to form respective different bit position portions of an output data word Rd.

The invention also provides a computer program product storing a computer program for controlling a general purpose computer to act in accordance with the above techniques. In particular, the invention provides a computer program including an instruction for controlling a computer to perform the operation as set out above.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
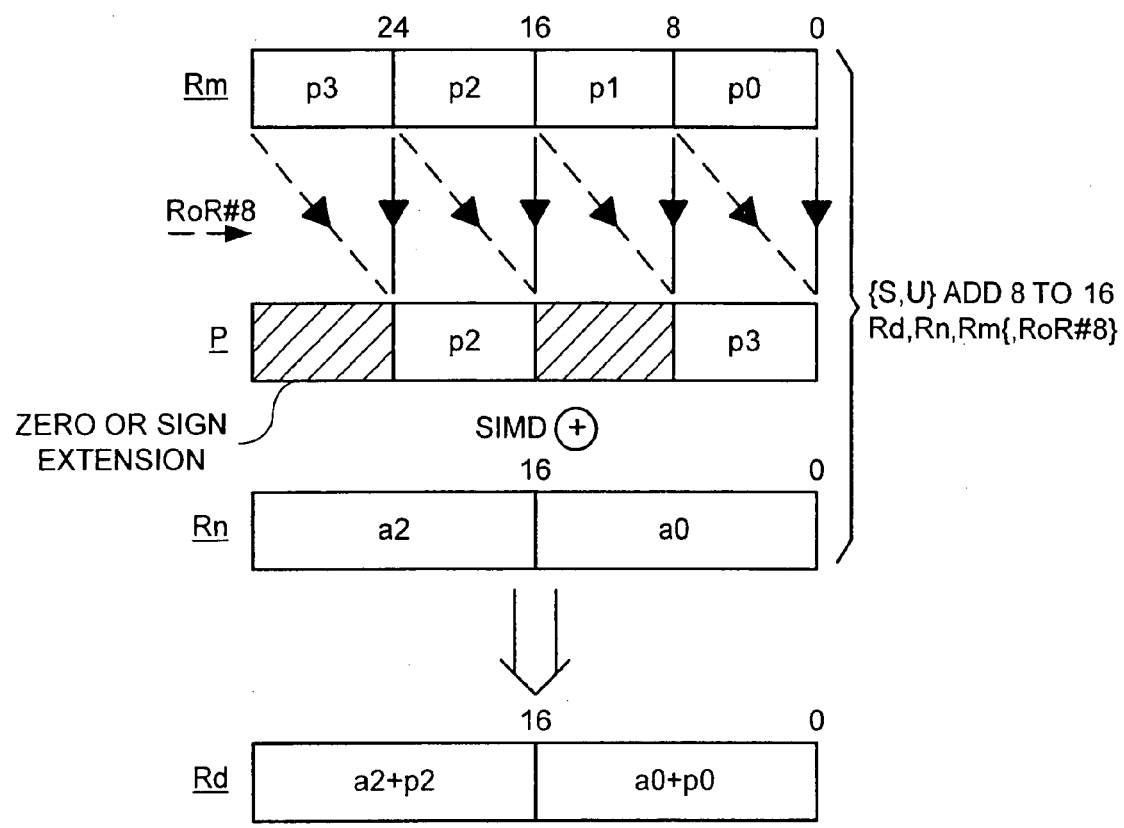
FIG. 1 schematically illustrates the action of a first SIMD type data processing instruction.

FIG. 1 illustrates the action of a first SIMD type data processing instruction termed ADD8TO16. This instruction comes in both signed and unsigned variants corresponding to the nature of the extension added to the front of a selected portion of each of the input operand data words as it is extended in length as part of the processing performed. The first input operand data word is stored within a register Rm of the data processing apparatus. The data word is formed of four 8-bit portions p0, p1, p2 and p3. Depending upon whether or not a rotate right operation of 8-bit positions is specified in the instruction, either the multibit portions p0 and p2 or alternatively the multibit portions p1 and p3 are selected out of the input data word within register Rm. The optional rotate right operation may also be by amounts of 16 and 24 if desired. This effectively allows the high and low order portions to be swapped around. The example illustrated in FIG. 1 shows the non-adjacent portions p0 and p2 being selected in the unrotated (shifted) variant with the other variant being indicated by the dotted lines.

When the multibit portions have been selected, each is promoted in length from 8 bits to 16 bits using either zero or sign extension. The shaded portions of the promoted data word P shown in Figure indicate these extension portions.

The second input data word is stored within a register Rn and comprises two 16-bit data values. The example illustrated performs a single-instruction-multiple-data add operation whereby the extended p0 value is added to the lower 16 bit value a0 of Rn whilst the extended p2 value is added to the upper 16 bit portion a2 of the Rn value. This type of addition is one which may be considered as a fill width addition with the carry chain broken between the $15^{th}$ and $16^{th}$ bits of the result. It will be appreciated that other SIMD type arithmetic operations may be performed, such as, for example, a SIMD subtraction The output result data word generated by the instruction of FIG. 1 produces in the lower 16 bits the sum of p0 and a0 whilst the upper 16 bits contain the sum of p2 and a2. This instruction is particularly useful in operations that determine the sun of absolute differences between respective data values whereby the a0 and a2 represent accumulate values with the values p0 to p3 representing individual absolute values of signal difference values, such as pixel difference values. This type of operation is commonly needed in MPEG motion estimation processing and the ability to perform this operation at high speed is strongly advantageous.

Figure 2:
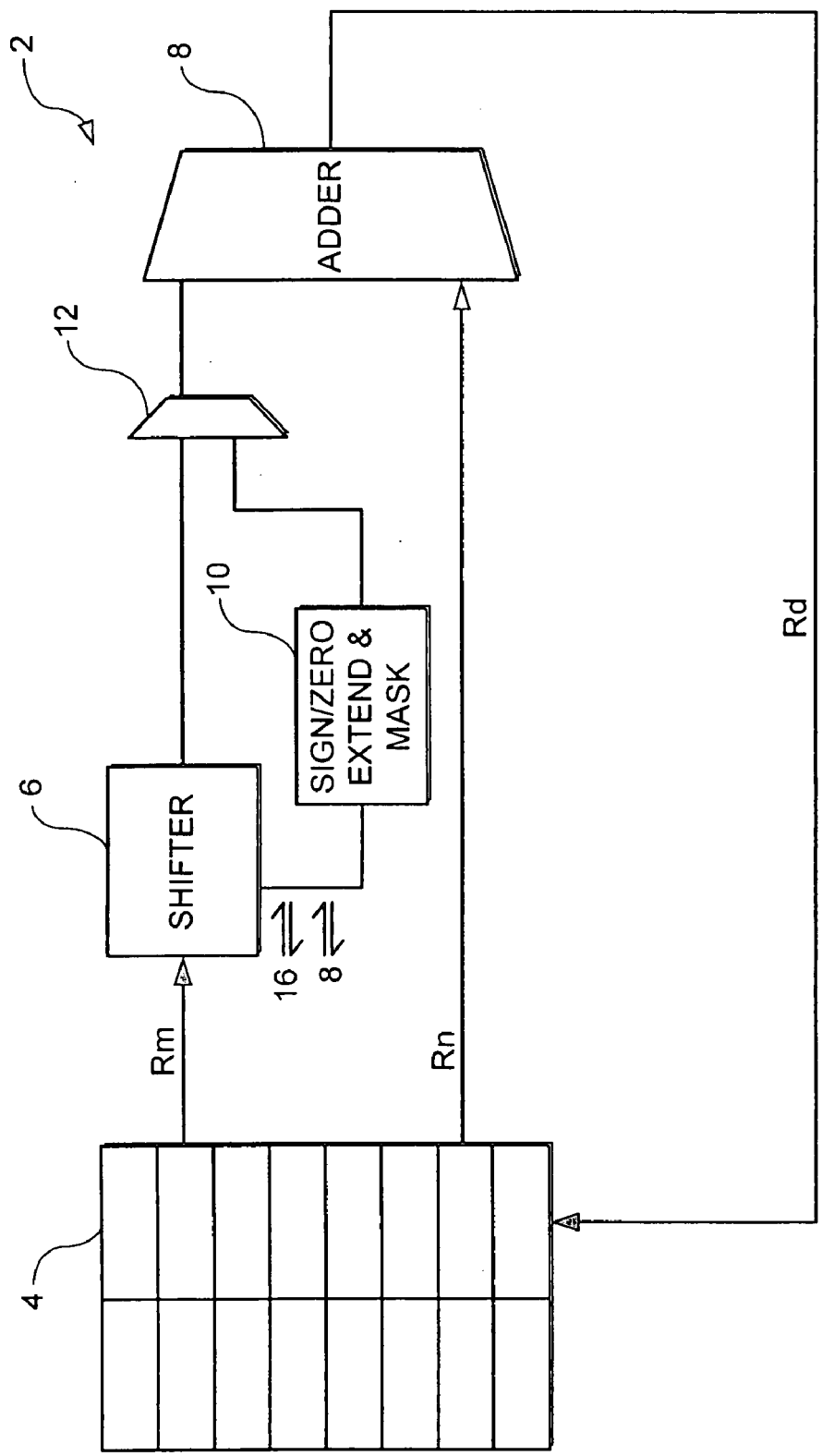
FIG. 2 schematically illustrates a data path within a processing apparatus of a type well suited to executing the data processing instruction of FIG. 1.

FIG. 2 illustrates an example data path 2 of a data processing system that may be used to implement the instruction of FIG. 1. A register bank 4 holds 32-bit data words to be manipulated. Both the input operand data words stored in Rm and Rn are read from this register bank and the result data word is written back to register Rd in the register bank 4. The data path 2 includes a shifting circuit 6 and an adder circuit 8. The many other data processing instructions provided by the system utilize this shifting circuit 6 and adder circuit 8 in various different ways. Such a data path 2 is carefully designed so that the time taken for a data value to propagate through the shifting circuit 6 and the adder circuit 8 is well matched to the data processing cycle time. Efficient use of the hardware resources of the data path 2 is made in systems in which those resources are active for a high proportion of every data word propagating through the data path 2. A sign/zero extending and masking circuit 10 is provided in parallel with lower portion of the shifting circuit 6. A multiplexer 12 is able to select either the output of the full shifting circuit 6 or the output of the sign/zero extending and masking circuit 10 as one of the inputs to the adder circuit 8. The other input to the adder circuit 8 is the input operand data word of Rn.

When executing the instruction of FIG. 1, the input operand data word of Rm is supplied to the shifting circuit 6 in which an optional right shift of 8-bit positions is applied to the data word in dependence upon whether or not that parameter was specified within the instruction. Optional right rotates of 16 and 24 bit positions may also be applied. Within a multilevel multiplexer based shifter, such a restricted possibility shift may be provided relatively simply from a first portion of the shifting circuit 6 (e.g. in the case of a 32-bit system the first level of multiplexer may provide 16 bits of shift and the second level of multiplexer provides 8 bits of shift). Accordingly, a value optionally shifted by the specified amount can be tapped off from part way through the shifting circuit 6 and supplied to the sign/zero extending and masking circuit 10. This circuit 10 operates to mask out the non-selected multibit portions of the possibly shifted input operand data word of Rm and replace these masked out portions with either zeros or a sign extension of their respective selected multibit portions. The output of the sign/zero extending and masking circuit 10 passes via a multiplexer 12 to a first input of the adder circuit 8. The second input of the adder circuit 8 is the input operand data word of Rn. The adder circuit 8 performs a SIMD add upon its inputs (i.e. two parallel 16-bit adds with the carry chain effectively broken between bit positions 15 and 16) The output of the adder circuit 8 is written back into register Rd of the a register bank 4.

As an alternative, the sign/zero extending and masking circuit 10 may take Rm (unrotated) as its input and then itself perform a rotate of 0, 8, 16 or 24 upon the four possible sign bits and then create the mask. The shifting circuit 6 would operate in parallel to shift the whole 32 bits of Rm.

Figure 3:
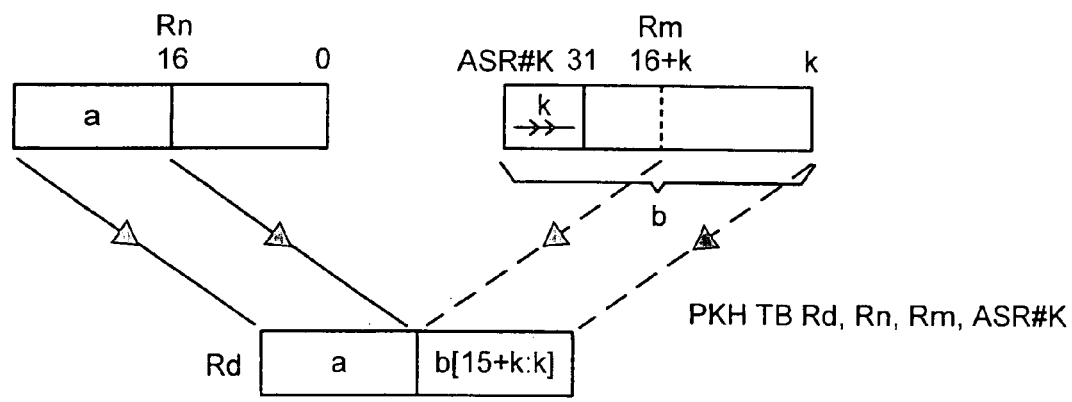
FIGS. 3 and 4 schematically illustrate two variants of a further SIMD type data processing instruction.
Figure 4:
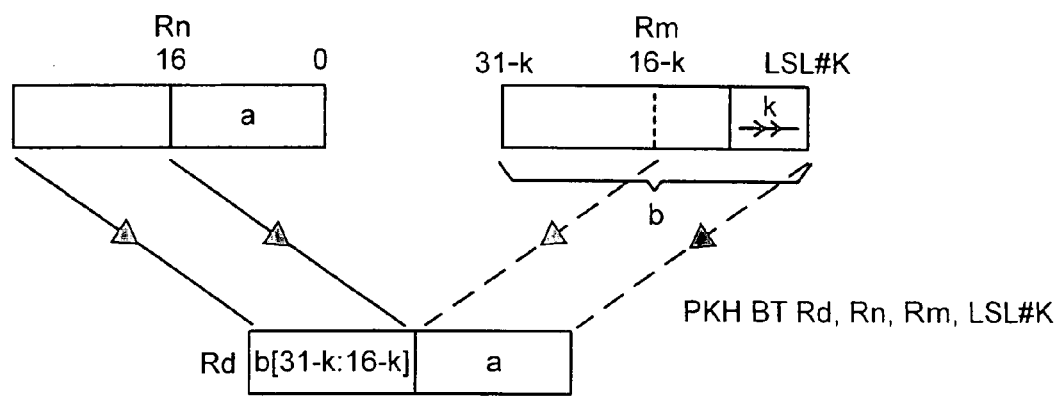

FIGS. 3 and 4 illustrate two variants of a half word packing SIMD type instruction. The PKHTB instruction of FIG. 3 takes a fixed top half of one input operand data word stored in register Rn and a variable position half bit portion of a second input operand data word stored in register Rm and combines these into respectively the top half and the bottom half of an output data word to be stored in register Rd. The instruction PKHBT takes the bottom half of an input operand data word of Rn and a variable position half word length portion of a second input operand data word of Rm and combines these respectively into the bottom and top halves of an output data word of Rd. It will be seen that the selected portion of the input operand data word of Rn in either case is unshifted in its location within the output data word Rd. This allows this portion to be provided by a simple masking or selecting circuit representing very little additional hardware overhead. The variable position half word portion of the instruction of FIG. 3 is selected from bit positions 15 to 0 of the word of Rm after that word has been right shifted by k bit positions. Similarly, the half word length variable position portion of Rm selected in accordance with the instruction of FIG. 4 is selected from bit positions 31 to 16 of the word of Rm after that word has been left shifted by k bit positions.

The variable shifting provided in combination with the packing function of the instructions of FIG. 3 and FIG. 4 is particularly useful for adjusting changes in the "Q" value of fixed point arithmetic values that can occur during manipulation of those values.

Figure 5:
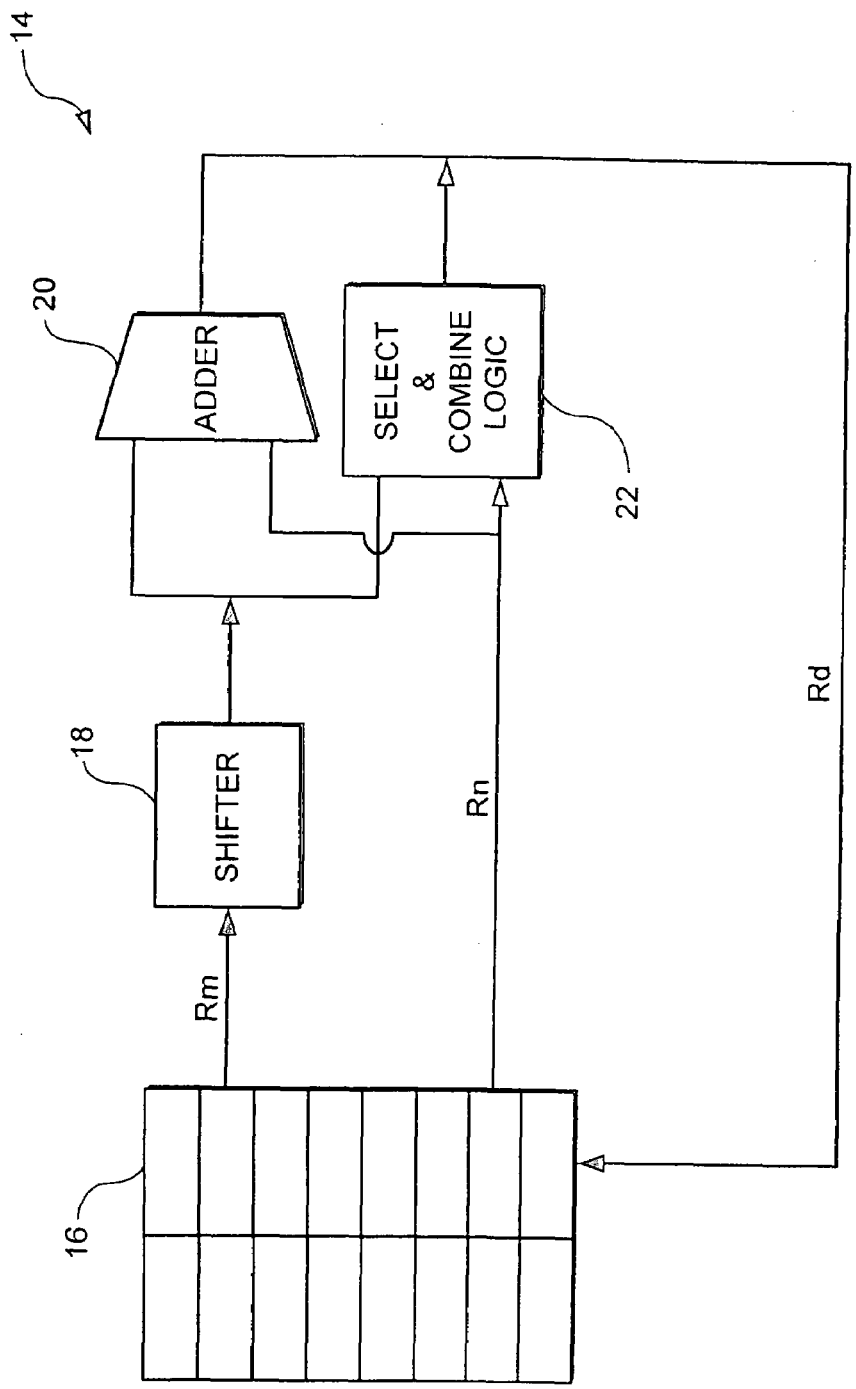
FIG. 5 schematically illustrates data path of a data processing system well suited for executing the data processing instructions of FIGS. 3 and 4.

FIG. 5 illustrates a data path 14 that is particularly well suited for performing the instructions of FIGS. 3 and 4. A register bank 16 again provides the input operand data words, being 32-bit data words in this example, and stores the output data word. The data path includes a shifting circuit 18, an adder circuit 20 and a selecting and combining circuit 22.

In operation, the unshifted input operand data word of Rn passes directly from the register bank 16 to the selecting and combining logic 22. In the case of instruction of FIG. 3, the most significant 16 bits of the value of Rn are selected and form the corresponding bits within the output data word Rd. In the case of the instruction of FIG. 4 it is the least significant 16 bits of the input operand data word of Rn that are selected and passed to form the least significant bits of the output data word Rd. The input operand data word of Rm passes through the full shifting circuit 18. In the case of the instruction of FIG. 3, an arithmetic right shift of k bit positions is applied and then the least significant 16 bits from the output of the shifting circuit 18 are selected by the selecting and combining circuit 22 to form the leas significant 16 bits of the output data word of Rd. In die case of the instruction of FIG. 4, the shifting circuit 18 provides a left logical shift of k bit positions and supplies the result to the selecting and combining circuit 22. The selecting and combining circuit 22 selects the most significant 16 bits of the output of the shifting circuit 18 and uses these to form the most significant 16 bits of the output data word of Rd.

It will be seen that the selecting and combining circuit 22 is provided in a position in parallel with the adder circuit 20 Accordingly, given that the data path 14 is carefully designed to allow for a fill shift and add operation to be performed within a processing cycle, the relatively straight forward operation of selecting and combining can be provided within the time period normally allowed for the operation of the adder circuit 20 without imposing any processing cycle constraints.

It will be understood that the data processing instructions explained above and as defined in the claims have been defined in terms of the result value achieved. It will be appreciated that the same result value can be achieved with many different processing steps and orders of steps. The invention encompasses all of these variants that produce the same final result value using a single instruction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   (i) a shifting circuit;
   (ii) a bit portion selecting and combining circuit; and
   (iii) an instruction decoder, responsive to an instruction to control said shifting circuit and said bit portion selecting and combining circuit, for performing an operation upon a data word Rn and a data word Rm, wherein said operation yields a value given by:
      (a) selecting a first portion of bit length A of said data word Rn extending from one end of said data word Rn;
      (b) selecting a second portion of bit length B of said data word Rm subject to an arithmetic right shift by a right-shift amount specified as a shift operand within said instruction, said right-shift amount being independent of said bit length A of said first portion; and
      (c) combining said first portion and said second portion to form respective different bit position portions of an output data word Rd.

2. Apparatus as claimed in claim 1, wherein said first portion extends from a most significant bit end of said data word Rn.

3. Apparatus as claimed in claim 1, wherein said first portion extends from a least significant bit end of said data word Rn.

4. Apparatus as claimed in claim 1, wherein said shift operand can specify a number of bit-positions representing an amount of arithmetic right shift to apply to said data word Rm.

5. Apparatus as claimed in claim 1, wherein said first portion and said second portion abut within said output data word Rd.

6. Apparatus as claimed in claim 5, wherein said output data word has a bit length of C and C=A+B.

7. Apparatus as claimed in claim 6, wherein A=B.

8. Apparatus as claimed in claim 1, wherein A=16.

9. Apparatus as claimed in claim 1, wherein B=16.

10. Apparatus as claimed in claim 1, wherein said instruction combines a data value pack operation with a shift operation.

11. Apparatus as claimed in claim 1, wherein said shifting circuit is upstream of said selecting and combining circuit in a data path of said apparatus.

12. Apparatus as claimed in claim 11, wherein said selecting and combining circuit is disposed in parallel to an arithmetic circuit within said data path.

13. A method of data processing, said method comprising the steps of decoding and executing an instruction by performing an operation on a data word Rn and a data word Rm, wherein said operation yields a value given by:
   (i) selecting a first portion of bit length A of said data word Rn extending from one end of said data word Rn;
   (ii) selecting a second portion of bit length B of said data word Rm subject to an arithmetic right shift by a right-shift amount specified as a shift operand within said instruction, said right-shift amount being independent of said bit length A of said first portion;
   (iii) combining said first portion and said second portion to form respective different bit position portions of an output data word Rd; and
   (iv) storing said output data word Rd.

14. A computer program provided on a computer-readable medium, said computer program for controlling a computer to perform the steps of decoding and executing an instruction for performing an operation upon a data word Rn and a data word Rm, wherein said operation yields a value given by:
   (i) selecting a first portion of bit length A of said data word Rn extending from one end of said data word Rn;
   (ii) selecting a second portion of bit length B of said data word Rm subject to an arithmetic right shift by a right-shift amount specified as a shift operand within said instruction, said right-shift amount being independent of said bit length A of said first portion;
   (iii) combining said first portion and said second portion to form respective different bit position portions of an output data word Rd; and
   (iv) storing said output data word Rd.

* * * * *